United States Patent [19]

Passariello

[11] 4,430,254
[45] * Feb. 7, 1984

[54] SPHERICAL CERIUM-ACTIVATED CATALYST FOR AMMONIA SYNTHESIS AND PROCESS FOR ITS MANUFACTURE

[75] Inventor: Attilio Passariello, Tivoli, Italy

[73] Assignee: Ammonia Casale S.A., Lugano, Switzerland

[*] Notice: The portion of the term of this patent subsequent to Dec. 29, 1998 has been disclaimed.

[21] Appl. No.: 305,037

[22] Filed: Sep. 23, 1981

Related U.S. Application Data

[63] Continuation of Ser. No. 117,780, Feb. 1, 1980, Pat. No. 4,308,174.

[30] Foreign Application Priority Data

Feb. 7, 1979 [IT] Italy .................. 47920 A/79

[51] Int. Cl.³ ............................ B01J 29/06
[52] U.S. Cl. .................. 502/243; 502/527
[58] Field of Search ............ 252/455 R, 462; 423/362, 363

[56] References Cited

U.S. PATENT DOCUMENTS

| 3,951,862 | 4/1976 | Sze ...................... 252/462 |
| 3,992,328 | 11/1976 | Sze et al. ................ 252/462 |
| 4,073,749 | 2/1978 | Passariello ........... 252/466 J |
| 4,308,174 | 12/1981 | Passariello ............ 252/462 |

Primary Examiner—Edward J. Meros
Assistant Examiner—Wayne A. Langel
Attorney, Agent, or Firm—Holman & Stern

[57] ABSTRACT

A spherical cerium-activated catalyst for the $NH_3$ synthesis is prepared by: mixing magnetite with (by weight): 2-3.5% of aluminium oxide, 0.8-2% potassium hydroxide, 2-3.5% calcium oxide, 0.1-0.4% magnesium oxide and 0.2-0.5% silica; melting this mixture in a furnace at a temperature of at least 1600° C.; air-cooling the molten mass, removing melted slag; crushing the deslagged mass in a crusher and pulverizing it in a rod-mill; adding in a mixer to the so obtained powder a cerium nitrate solution in quantities to obtain in the final catalyst a metallic cerium concentration of 0.5 to 2.5%; pelletising the so added powder in a tray pelletiser to obtain a sphere shaped catalyst; drying said catalytic spheres in a furnace at 100°-200° C., and sintering them in an argon atmosphere at a temperature of 1250°-1350° C.

6 Claims, 2 Drawing Figures

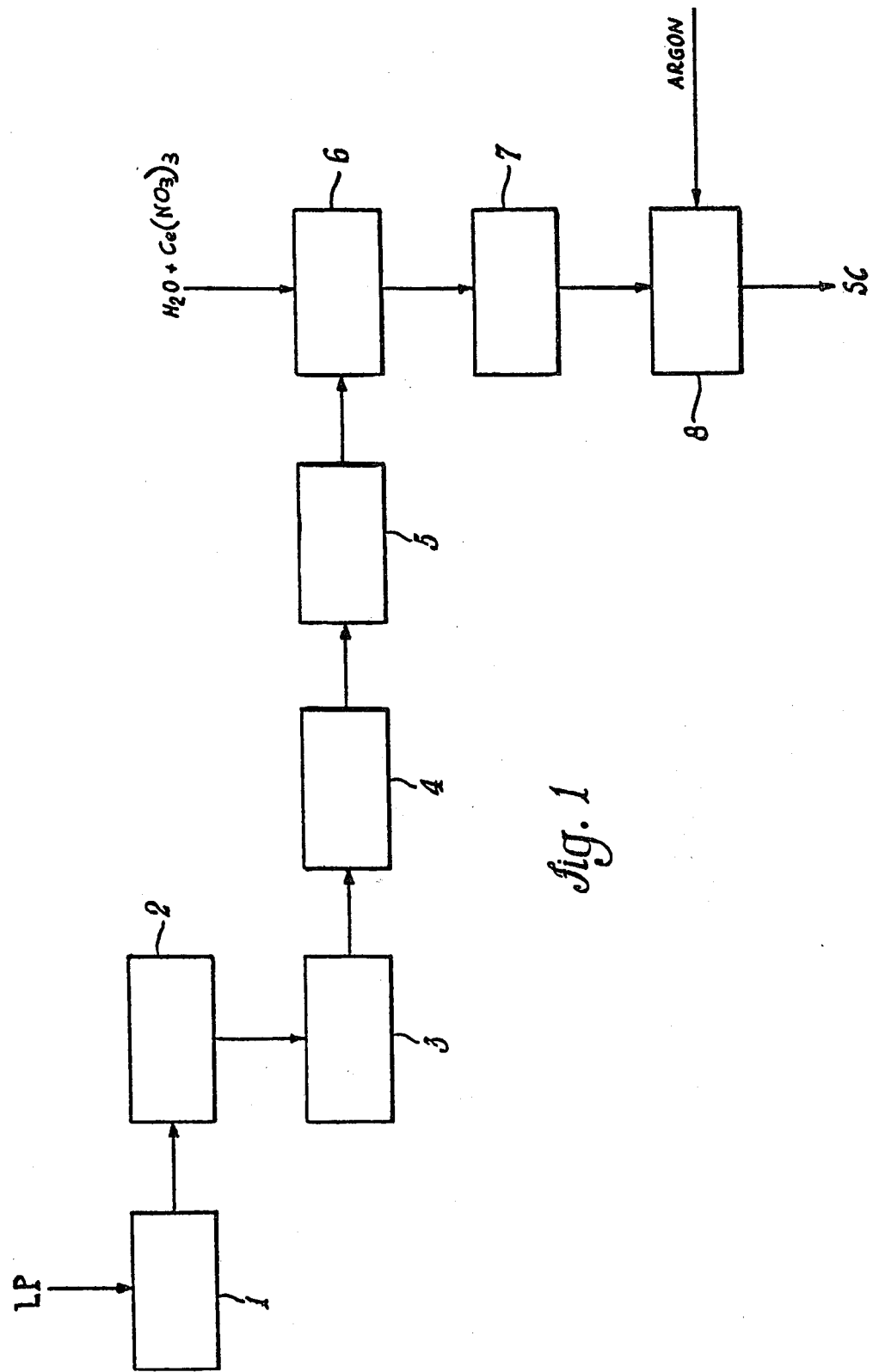

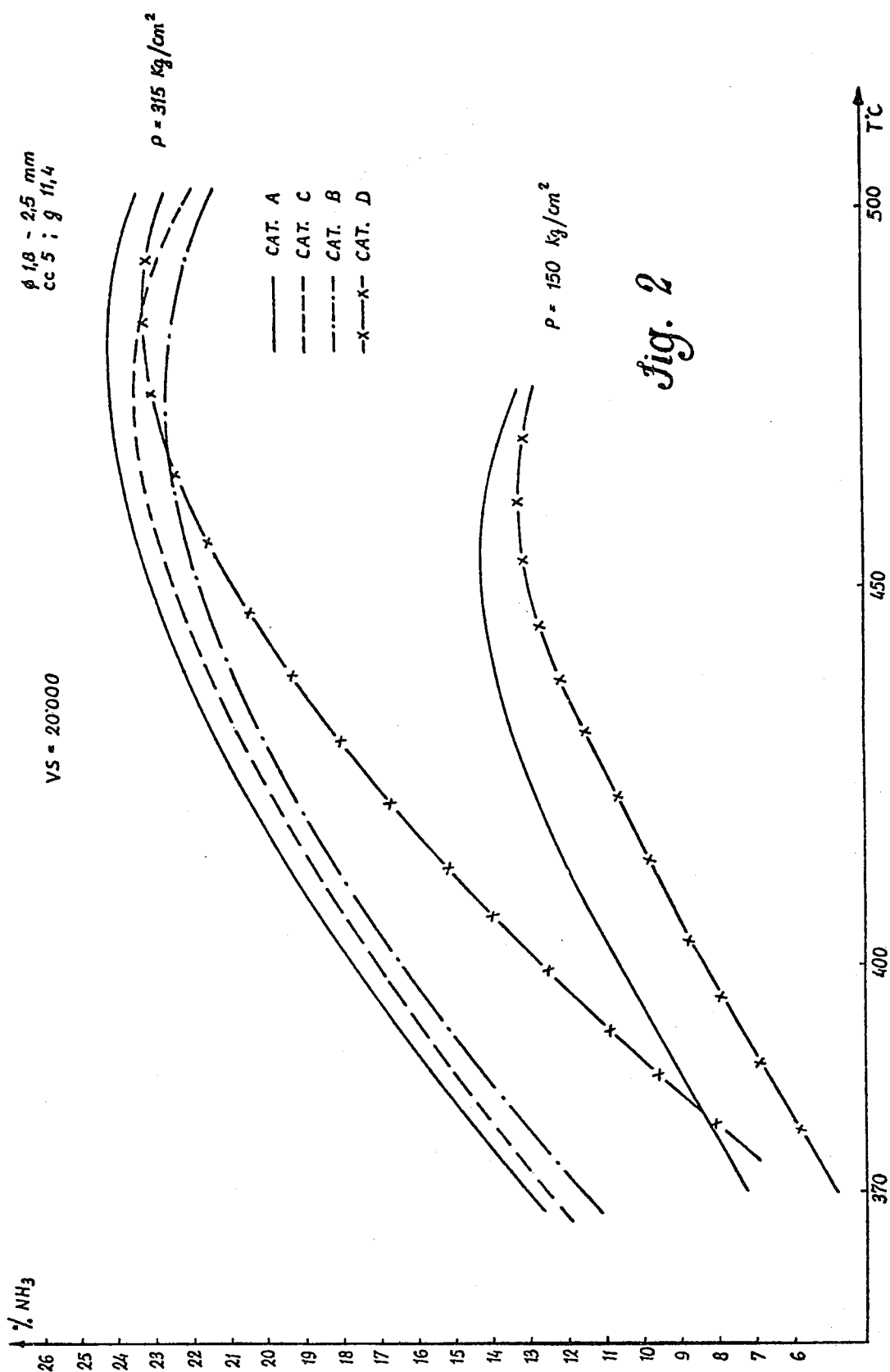

SPHERICAL CERIUM-ACTIVATED CATALYST FOR AMMONIA SYNTHESIS AND PROCESS FOR ITS MANUFACTURE

This is a continuation of application Ser. No. 06/117,780, filed Feb. 1, 1980 now U.S. Pat. No. 4,308,174.

BACKGROUND OF THE INVENTION

1. Field of the Invention

The present invention relates to a process for manufacturing a spherical cerium-activated catalyst for the synthesis of ammonia.

More particularly the invention concerns a process in which cerium-activated catalysts in the form of spheres having regular diameters of from 1 to 25 mm are prepared by mixing magnetite with (by weight) 2-3.5% of aluminium oxide, 0.8-2% potassium hydroxide, 2-3.5% calcium oxide, 0.1-0.4% magnesium oxide and 0.2-0.5% silica; melting this mixture in a furnace at a temperature of at least 1600° C.; air-cooling the molten mass, removing melted slag; crushing the deslagged mass in a crusher and pulverising it in a rod-mill; adding in a mixer to the so obtained powder a cerium nitrate solution in quantities to obtain in the final catalyst a metallic cerium concentration of 0.5 to 2.5%; pelletising the so added powder in a tray pelletiser to obtain a sphere shaped catalyst; drying said catalytic spheres in a furnace at 100°-200° C., and sintering them in an argon atmosphere at a temperature of 1250°-1350° C.

The invention also comprises a cerium-activated catalyst in form of pelletised spheres, which contain from 0.5 to 2.5% cerium, show a high activity, a high resistance to thermal stresses and to chemical poisons, a uniform distribution of the synthesis gas and a low pressure drop, and are safe to handle and not-brittle.

2. Description of the Prior Art

It is known from old literature that elements such as ruthenium, cerium, titanium activate iron-based catalysts for ammonia synthesis when skillfully added in small quantities.

Processes have been recently disclosed in which the promoted and *reduced* iron oxides are treated with an aqueous solution of a cerium nitrate. More particularly the process according to U.S. Pat. No. 3,951,862 (Lummus) comprises: mixing an iron oxide with traces of conventional promoters (alumina, calcium oxide, potassium and silica) fusion of the blend in the presence of 0.1-0.2 powdered graphite; crushing and screening of the fused and cooled pig; reduction of the catalyst with $H_2$ or $H_2 + N_2$ gas mixture; treatment of the reduced catalyst with a cerium nitrate solution; and drying. In the U.S. Pat. No. 3,992,328 (also to Lummus) the fused and reduced catalyst is submitted to a process in which air is evacuated from the pores before impregnating it with the aqueous solution of a cerium salt or of a mischmetal salt including cerium.

Accordingly the main features of the processes described in the above patents are:

(1) the form of the catalysts is that obtained by breaking the pig with a hammer, by crushing and by screening (the under- and oversized material being recycled); irregular granules of 1-3 mm are used which however are scarcely efficient in certain plants (especially where there is no radial stream);
(2) a first reduction of the catalyst with $H_2$ or $H_2 + N_2$ is necessary;
(3) the treatment with the cerium nitrate solution is carried out on the catalyst so reduced;
(4) complex treatments with mixtures of oxygen and nitrogen (1% $O_2$ and 99% $N_2$ in a first step, and 5% $O_2$ and 95% $N_2$ in a third step) are necessary;
(5) the catalyst undergoes full oxidation by the air and nitrous and nitric oxide formed by the decomposition of the cerium nitrate;
(6) a second reduction is thus necessary;
(7) although it is said that the amount of cerium added to the reduced catalyst may range from 0.1 to 1.5%, effective results are obtained with 0.3-0.8% particularly with 0.45-0.7% by weight of cerium;
(8) the catalysts seem most efficient within a temperature range of from 400° to 480° C.

U.S. Pat. No. 4,073,749 (S.I.R.I) describes a spherical catalyst which is pelletized thanks to the addition of water and bentonite to the catalyst powder, i.e. by the addition of a binder mixture which reduces the catalyst activated mass.

SUMMARY OF THE INVENTION

Applicants now have discovered that ammonia synthesis catalysts, which make ammonia production possible at lower temperatures and/or lower pressures, can be prepared in form of pelletized spheres by incorporating cerium nitrate into a fused but unreduced catalyst (based on promoted iron oxides) before pelletization.

It is accordingly an object of this invention to prepare a spherically pelletized cerium activated catalyst. Another object is to prepare an oxidized pelletized cerium activated catalyst with a wide range of metallic cerium of from 0.5 to 2.5%. A further object is an oxidized catalyst in the form of regular spheres with diameters of from 1 to 25 mm, containing metallic cerium from 0.5 to 2.5% and showing a high catalytic activity particularly in the temperature range of 370°-450° C., a high resistance to thermal stresses and to chemical poisons, a uniform distribution of the synthesis gas and a low pressure drop. Still another object of the invention is a process to prepare the above catalyst, which may be easily and advantageous employed on an industrial scale. Finally another object is a process in which the double catalyst reduction is avoided and the cerium nitrate is added before the pelletization and acts therein as binder and thereafter is decomposed to penetrate, during sintering into the catalyst structure as a metallic promoter.

Since the equilibrium in the formation of ammonia is favoured by low temperatures, it follows that the spherical catalyst according to the invention, other conditions being equal (pressure, space velocity, etc.), will effect a faster conversion to ammonia, hence higher production.

This advantage can be particularly useful with Casale reactors where, to avoid overheating of the catalytic mass central part, temperature in the terminal part of the reaction zone must sometimes be kept below 400° C.

In the process according to this invention the catalyst is obtained by: mixing magnetite with (by weight) 2-3.5% of aluminium oxide, 0.8-2% potassium hydroxide, 2-3.5% calcium oxide, 0.1+0.4% magnesium oxide and 0.2-0.5% silica; melting this mixture in a furnace at a temperature of at least 1600° C.; air-cooling the molten mass, removing melted slag; crushing the deslagged mass in a crusher and pulverising it in a rod-mill; adding in a mixer to the so obtained powder a cerium nitrate solution in quantities to obtain in the final catalyst a metallic cerium concentration of 0.5 to 2.5%; pelletising the so added powder in a tray pelletiser to obtain a sphere shaped catalyst; drying said catalytic spheres in the furnace at 100°–200° C., and sintering them in an argon atmosphere at a temperature of 1250°–1350° C.

BRIEF DESCRIPTION OF THE DRAWINGS

The various features and advantages of the invention will better appear from the description of the non-limiting embodiment shown in the attached drawings in which FIG. 1 is a flow-sheet of the process and FIG. 2 are diagrams reporting the activity (NH$_3$ production as a function of the catalyst temperatures, at pressures of 315 Kg/cm$^2$ and 150 kg/cm$^2$, respectively, at a space velocity of 20.000, of catalyst spheres having diameters of 1.8 to 2.5 mm). The activity of the catalysts A (1.29% Ce), B (2.3% Ce) and C (0.64% Ce) according to the invention is compared to that of the spherical catalyst according to the U.S. Pat. No. 4,073,749 (containing no cerium) at a parity of all other conditions.

DETAILED DESCRIPTION OF THE PREFERRED EMBODIMENTS

The present invention will be now described with reference to the attached drawings and illustrated by means of the following examples without however limiting the invention itself.

With reference to FIG. 1 the reference numeral 1 denotes the mixer for the loading powder consisting of magnetite, aluminium oxide, potash, calcium oxide and magnesium oxide.

It has been found as extremely advantageous that: (1) all promoters be added directly as oxides (and not as salts or other compounds); (2) the percent of said promotors be kept within the intervals (by weight on the magnetite weight) 2.0–3.5 aluminium oxide, 0.8–2 potash, 2–3.5 calcium oxide, 0.1–0.4 magnesium oxide and 0.2–0.5 silica respectively; (3) the magnetite have a critical ratio of FeO/Fe$_2$O$_3$ comprised between 27–30% preferably 28–29% FeO.

From said mixer 1 the mixed charge is transferred to the furnace 2, preferably of the resistance type and melted at temperature not less than 1600° C. When the melting stage is ended, the molten mass is first left to solidify and cool in air, in the crucible inside the furnace, than the mass is removed from the crucible, further cooled in air 3 and freed from the slag. The air cooling (i.e. a low velocity cooling) has been found important as it does not essentially modify the FeO/Fe$_2$O$_3$ ratio of the magnetite. The deslagged mass from 3 is then crushed in crusher 4 and pulverized in rod (bar) mill 5 from which a rugged, wrinkly and porous powder is obtained which is transferred into mixer 6 where it is added with a cerium nitrate solution concentrate to obtain in the final catalyst a cerium concentration (expressed as metal) of from 0.5 to 2.5% by weight on the total unreduced catalyst composition.

It has surprisingly been noted that while a ball mill gives small powdery granules having smooth and levigated surface which not only absorbs a negligible cerium nitrate amount but moreover does not allow the successive pelletisation, the small powdery granules from bar-mill 5, being unlevigated and extremely porous, absorb a consistent amount of Ce-nitrate (corresponding to a metallic cerium concentration up to 2.5% (which is very high in comparison to the maximum efficient amount incorporated in the unreduced catalysts of the U.S. Pat. Nos. 3,992,328 and 3,951,862); furthermore this porous powder from the bar mill 5 makes possible the successive pelletisation which otherwise would not occur.

The catalyst powder added with cerium nitrate in mixer 6 is transferred to tray granulator 7 allowing the catalyst to be obtained in the form of spherical granules. Said granulator 7 is provided with an internal dish (having f.i. a diameter of from 90 to 150 cm) whose inclination over an horizontal plane can be regulated from about 5° to 85°, the lower the inclination angle the lower the diameter of the spheres formed thereupon. It has been found that by using in combination a bar-mill 5 (giving a unlevigated powder) and a tray granulator 7, the pelletisation in this last occurs regularly and without powder loss. Indeed the porous powder from 5 (which has easely absorbed the cerium nitrate in mixer 6) forms immediately regular granules while falling on the dish of the tray granulator 7, which granules grow, in very short time, in the form of regular spheres absorbing all the powder fed to same granulator. Indeed the granule growing is only a function of the powder feed to 7 whereby there is practically no loss of powder. Moreover the pelletised catalyst spheres from 7 are, surprisingly, easy to handle and non-brittle. They can thus be easily manipulated and treated for preliminary drying at 100°–200° C. in furnace 8 and then sintered therein in an argon atmosphere at 1250°–1350° C.

EXAMPLE 1

A charge consisting of 200 kg of natural magnetite, 4.6 kg of aluminium oxide, 2.7 kg of potassium hydroxide, 6.7 kg of calcium oxide and 0.28 kg of magnesium oxide, 1.44 kg of silica is transferred to a mixer and then melted at 1600° C. within 1 hour.

The above mixture had a content of 61.4% Fe$_2$O$_3$ and of ca. 28% FeO. The mass obtained from melting, after being solidified by air cooling inside the crucible, is removed from the crucible and, after the mass has been fully cooled; it is deslagged, crushed and pulverised in rod mill 5.

The powder obtained from rod mill weighing 5 kg and having the following granulometry;

| mesh | 65–120 | 120–220 | 220–250 | 250–270 | 270–325 |
|------|--------|---------|---------|---------|---------|
| %    | 20.94  | 11.60   | 4.36    | 18.18   | 44.92   | is sprayed in mixer 6 with a solution of 0.2 kg of cerium nitrate Ce(NO$_3$)$_3$.6H$_2$O in 0.2 kg of water (1.29% weight of metallic Ce in the finished product; CAT. A). The so sprayed powder is sent on the dish (having a diameter of 125 cm and an inclination of 60° on the horizontal plane) of tray granulator 7 on which in short time the powder is transformed into spherical granules which have diameters of from 0.2 to 0.5 mm and which grow, also in very short time, into spheres of diameters 1.5–2.5 mm by absorbing substantially all the powder as this last is gradually fed.

After granulation the product has the appearance of spherical granules (diameters of 1.5 to 2.5 mm) and is treated in an electric cockle 8 for a preliminary drying phase at 150° C. and the next sintering treatment in the said furnace in argon ambient at 1350° C.

EXAMPLE 2

2.8 kg of catalyst powder from rod mill 5 are sprayed with a solution consisting of 0.2 kg of cerium nitrate and 0.1 kg of water (2.3% weight of metallic Ce in the finished product; CAT B).

The sprayed powder is granulated, dried and sintered as described in Example 1. The sphere diameter (1.5-2.5) is maintained for comparison purpose.

EXAMPLE 3

5 kg of catalyst powder from rod mill 5 are treated with a solution consisting of 0.1 kg of cerium nitrate and 0.2 kg of water (0.64% by weight of metallic Ce in the finished product; CAT. C).

The sprayed powder is granulated dried and sintered as in Example 1.

The activity of the catalysts (A-B-C), according to the invention have been tested in an experimental reactor with the results shown in the attached diagram (FIG. 2) as compared to catalyst (CAT. D) known from U.S. Pat. No. 4,073,749.

The activity curves in the diagram show that the cerium-activated catalyst, compared with the known catalyst, at the same experimental conditions i.e. space velocity S.V.H-1 20,000 H-1, pressures 315 and 150 kg/cm$^2$, and respectively with the same average sphere diameter, (1.5-2.5 mm) presents a very high activity. More particularly it has been found that the efficiency of a cerium-activated catalyst gets higher as the temperature gets lower (350-400)C.).

Measurements have been taken under the following experimental conditions:

Pressures = 150; 315 kg/cm$^2$.
Temperature = 370°-400°-450°-475°-500° C.

$$S.V. = \frac{\text{normal liters/hour incoming gas}}{\text{liter of catalyst}} = 20,000$$

The catalysts of Examples 1-3 have been submitted to thermal resistance tests, consisting in determining the loss of activity at the same test conditions, before and after the same charge has been maintained for 10 hours at 600° C. and 315 abs.atm and a spacial velocity of 20.000. From the measures carried out it appeared that the catalyst A.B.C maintained their initial activity.

Furthermore, as pointed out, pelletisation of the known catalyst of U.S. Pat. No. 4,073,749 is effected by adding water and bentonite to the catalyst powder, while pelletisation of the catalyst according to this invention is effected by adding only an aqueous solution of cerium nitrate.

The behaviour of the nitrate is unexpected: indeed it distributes itself uniformly on the whole catalyst surface and acts as a binder in the granulation step while it decomposes in the successive drying and sintering steps in which the nitrogen oxides are automatically eliminated (without thus requiring a controlled calcination treatment as in the Lummus Patents) and the metallic cerium penetrates in the catalyst structure as compatible activity promoter in the sintering phase (which is an incipient fusion). This allows the obtainment of catalyst spheres with the whole surface active whereas, on the contrary, the bentonite added in the U.S. Pat. No. 4,073,749, though allowing as a binder a good granulation and sintering could remain on small surface portions and reduce their activity.

Accordingly the composition and succession of the process steps are critical as:

the slow cooling does not alter the starting activity of the magnetite;

the bar mill allows the obtainment of an unlevigated porous powder;

said porous powder can absorb consistent amounts of cerium nitrate, the dish granulator gives immediately small spherical granules which grow quickly to spheres by absorbing all the powder; supplied by simply varying the inclination angle of the dish it is possible to obtain spheres having diameters of from 1 to 25 mm which are safe to handle and not brittle;

sintering in an argon atmosphere avoids the formation of oxides of nitrogen and allows, at the temperatures of 1250°-1350° C., the penetration of the metallic cerium into the catalyst structure.

Particularly advantageous results have been obtained by using catalyst spheres according to the invention of 10-12 mm diameter to replace conventional irregular catalyst particles having sizes of from 12-21 mm; a much lower pressure drop has been measured together with a higher activity and thermoresistance, and with a uniform gas distribution. This is important because, as above stated, small catalyst particle sizes can not be used in many plants.

The present invention has been described and illustrated in one preferred embodiment, it is however understood that variations and changes with respect thereto might be practically adopted without departing from the scope of the invention.

What is claimed is:

1. An unreduced, porous, non-brittle catalyst for ammonia synthesis demonstrating a resistance to thermal stress and chemical poisoning and having a low pressure drop and having catalytic activity in the temperature range of 370° C. to 450° C., consisting essentially of:

magnetite having a FeO content of 26-30%, based on the weight of the magnetite;
2.0-3.5% aluminum oxide;
0.1-0.4% magnesium oxide;
0.2-0.5% silica; and
0.5-2.5% metallic cerium, in the form of pelletized spheres having diameters in the range of 1.0 to 25 mm.

2. The catalyst of claim 1, wherein the FeO content is 28-29%.

3. The catalyst of claim 1, wherein said catalyst additionally contains 2.0-3.5% calcium oxide.

4. The catalyst of claim 1 or 3, wherein said catalyst additionally contains 0.8-2.0% potassium hydroxide.

5. An unreduced, highly porous, non-brittle, spherically shaped, cerium activated catalyst for ammonia synthesis which demonstrates high catalytic effiency, high resistance to thermal stresses and to chemical poisons, low pressure drop, and uniform synthesis gas distribution produced by the process comprising:

mixing magnetite in proportions by weight, based on the weight of the magnetite, of
2.0-3.5% aluminum oxide,
0.8-2% potassium hydroxide,
2.0-3.5% calcium oxide,
0.1-0.4% magnesium oxide, and
0.2-0.5% silica;

melting the mixture so formed in a furnace at a temperature of at least 1600° C.;

air cooling the melted mixture and removing the melted slag;

crushing the melted mixture;

pulverizing the crushed mixture in a rod mill to form a porous powder;

mixing the porous powder with a solution of cerium nitrate in such proportions as to produce a metallic cerium concentration of 0.5–2.5% by weight in the final catalyst;

pelletizing the porous cerium-containing powder in a tray pelletizer to obtain non-brittle, spherical granules which absorb continuously additionally supplied powder;

drying the spherical granules at a temperature of from 100° C. to 200° C.; and sintering the dried spherical granules in an argon atmosphere at a temperature of from 1250°–1350° C.

6. The product according to claim 5, in which by varying the inclination of the pelletising tray spheres of diameters from 1 to 25 mm are obtained.

* * * * *